(12) United States Patent
Faile, Jr. et al.

(10) Patent No.: US 9,177,138 B2
(45) Date of Patent: Nov. 3, 2015

(54) CHANGE CONVERGENCE RISK PLANNING AND AVOIDANCE

(71) Applicant: BANK OF AMERICA CORPORATION, Charlotte, NC (US)

(72) Inventors: James W. Faile, Jr., Charlotte, NC (US); James J. Micek, Sewell, NJ (US); Roxanna L. Cummings, Greensboro, NC (US); Jodi L. Petersen, St. Louis, MO (US)

(73) Assignee: Bank of America Corporation, Charlotte, NC (US)

( * ) Notice: Subject to any disclaimer, the term of this patent is extended or adjusted under 35 U.S.C. 154(b) by 106 days.

(21) Appl. No.: 14/152,634

(22) Filed: Jan. 10, 2014

(65) Prior Publication Data

US 2015/0199511 A1 Jul. 16, 2015

(51) Int. Cl.
*G06F 21/55* (2013.01)
*G06F 21/57* (2013.01)
*G06F 21/00* (2013.01)

(52) U.S. Cl.
CPC .............. *G06F 21/55* (2013.01); *G06F 21/577* (2013.01)

(58) Field of Classification Search
CPC ..... G06F 21/55; G06F 21/577; H04L 63/126; H04L 63/1433
USPC ................................................. 726/25, 22, 28
See application file for complete search history.

(56) References Cited

U.S. PATENT DOCUMENTS

| | | | |
|---|---|---|---|
| 2007/0016955 A1* | 1/2007 | Goldberg et al. | 726/25 |
| 2012/0066763 A1* | 3/2012 | McHugh et al. | 726/22 |
| 2012/0072983 A1* | 3/2012 | McCusker et al. | 726/22 |
| 2012/0096558 A1* | 4/2012 | Evrard | 726/25 |
| 2013/0191919 A1* | 7/2013 | Basavapatna et al. | 726/25 |
| 2013/0232582 A1* | 9/2013 | Jin et al. | 726/28 |

* cited by examiner

*Primary Examiner* — Kambiz Zand
*Assistant Examiner* — Noura Zoubair
(74) *Attorney, Agent, or Firm* — Michael A. Springs; Moore & Van Allen PLLC; Peter B. Stewart

(57) ABSTRACT

Disclosed is a change convergence risk mitigation system. The change convergence risk mitigation system typically includes a processor, a memory, and a risk mitigation module stored in the memory. The change convergence risk mitigation system is typically configured for: receiving information associated with a plurality of events; determining an event risk score for each of the plurality of events; aggregating the event risk scores of the plurality of events and, based on the event risk scores, determining a risk level for each of the plurality of time periods; identifying a risk mitigation event; determining a risk mitigation time period from the plurality of time periods such that the risk mitigation time period would not have a predefined level if the risk mitigation event occurred during the risk mitigation time period; and providing a recommendation that the risk mitigation event occur during the risk mitigation time period.

12 Claims, 7 Drawing Sheets

FIG. 5

CHANGE CONVERGENCE RISK PLANNING AND AVOIDANCE

FIELD OF THE INVENTION

The present invention embraces a system for change convergence risk planning and avoidance. The system typically includes a processor and a memory. The system also typically includes a risk mitigation module stored in the memory, which is typically configured for receiving information associated with a plurality of events; determining an event risk score for each of the plurality of events; aggregating the event risk scores of the plurality of events and, based on the event risk scores, determining a risk level for each of the plurality of time periods; identifying a risk mitigation event; determining a risk mitigation time period from the plurality of time periods such that the risk mitigation time period would not have a predefined level if the risk mitigation event occurred during the risk mitigation time period; and providing a recommendation that the risk mitigation event occur during the risk mitigation time period.

BACKGROUND

Various methods exist to help businesses assess the business risks associated with events. That said, a need exists for an improved system for assessing risk.

SUMMARY

In one aspect, the present invention embraces a change convergence risk mitigation system and an associated method and computer program product. The change convergence risk mitigation system typically includes a processor and a memory. The change convergence risk mitigation system also typically includes a risk mitigation module stored in the memory and executable by the processor.

In one embodiment, the risk mitigation module is configured for: receiving information associated with a plurality of events occurring during a plurality of time periods, wherein the information associated with each event includes event timing information and event risk information; determining an event risk score for each of the plurality of events; aggregating the event risk scores of the plurality of events and, based on the event risk scores, determining a risk level for each of the plurality of time periods; identifying a risk mitigation event; based on an event risk score of the risk mitigation event, determining a risk mitigation time period from the plurality of time periods such that the risk mitigation time period would not have a predefined level if the risk mitigation event occurred during the risk mitigation time period; and providing a recommendation that the risk mitigation event occur during the risk mitigation time period.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
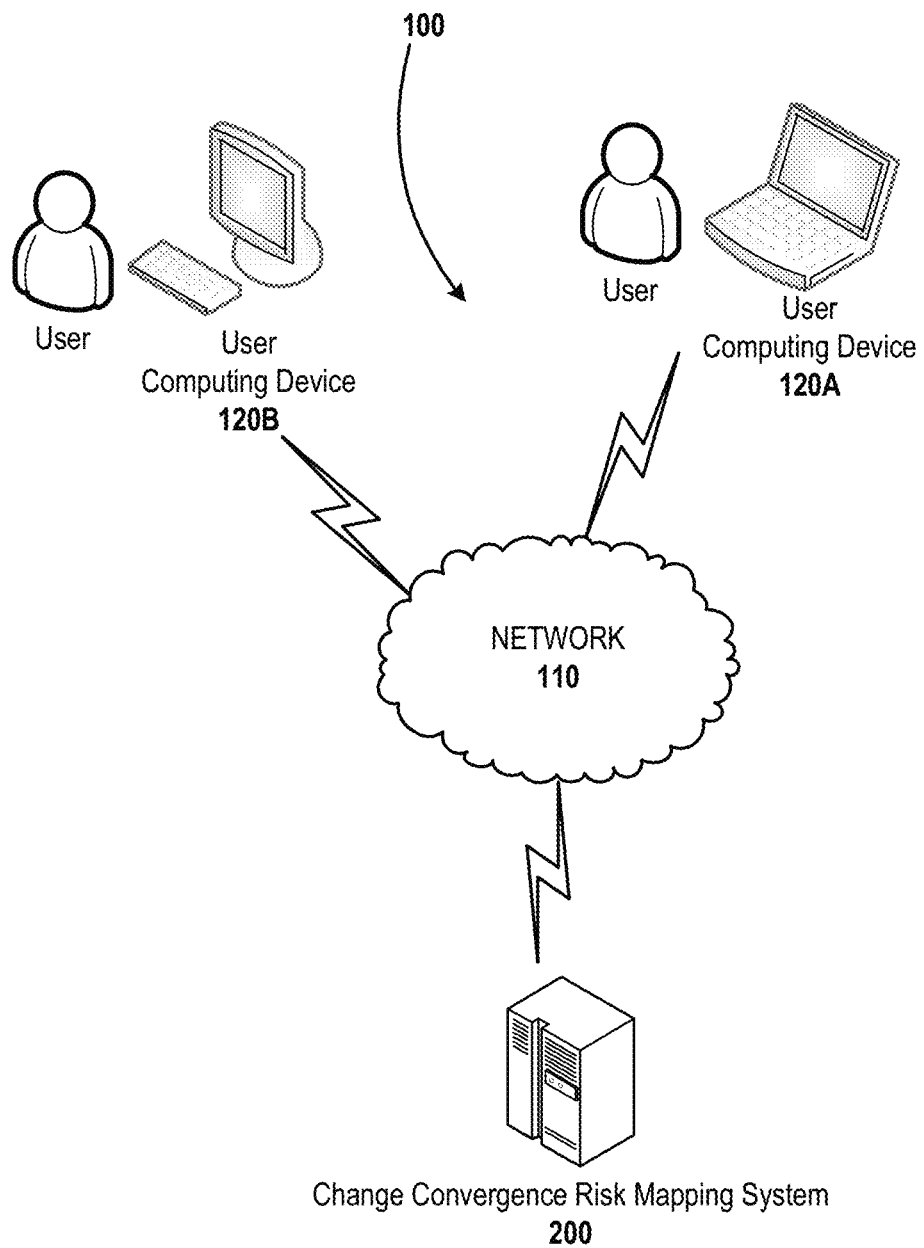
Figure 2:
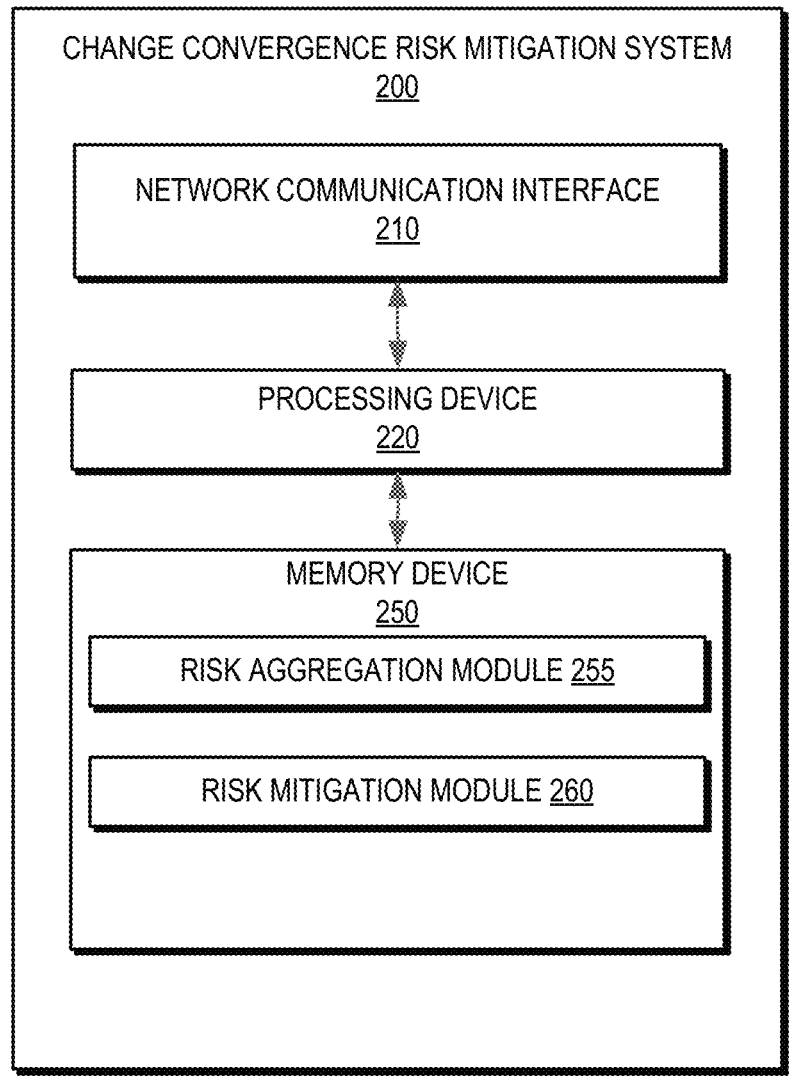
Figure 3:
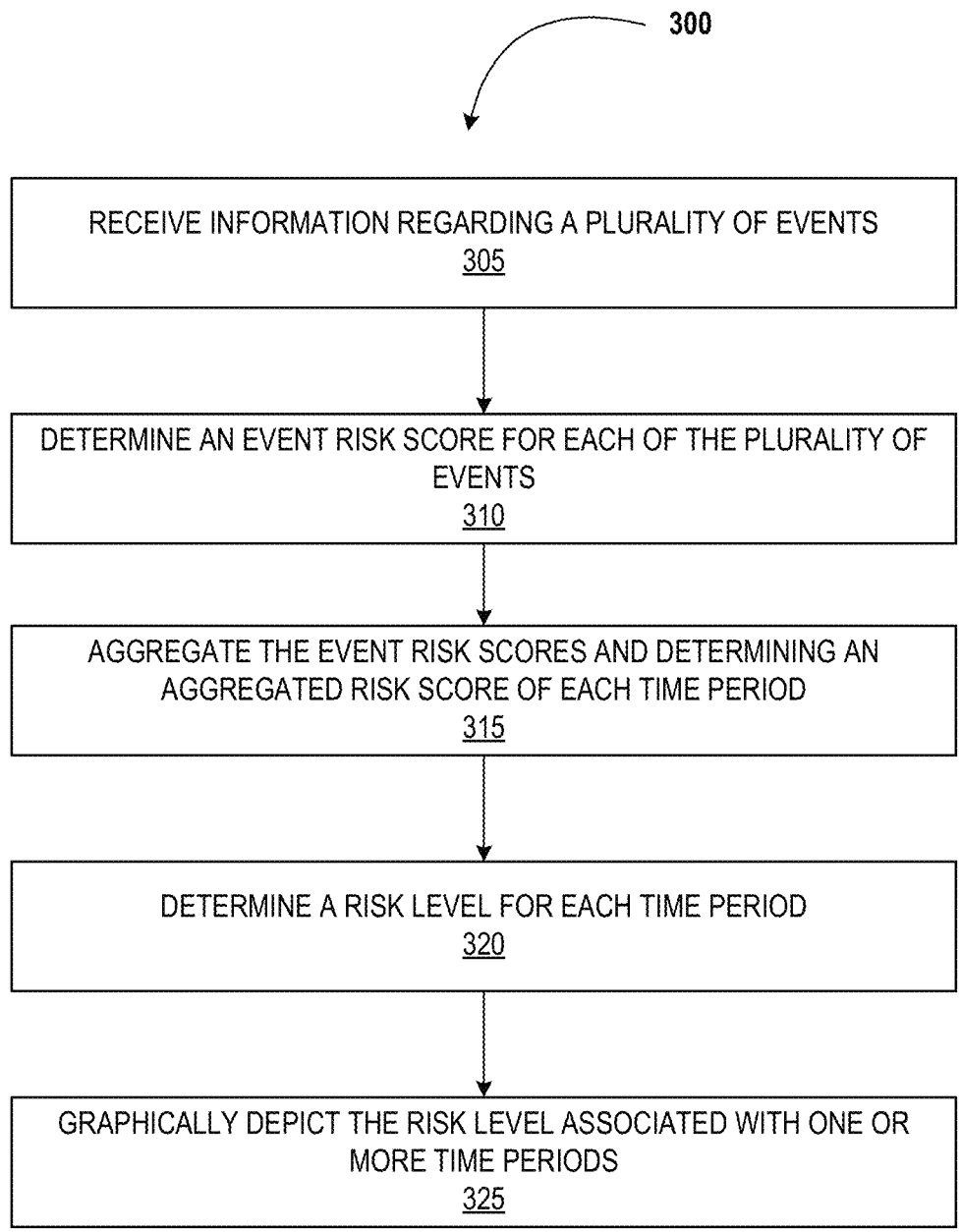
Figure 4:
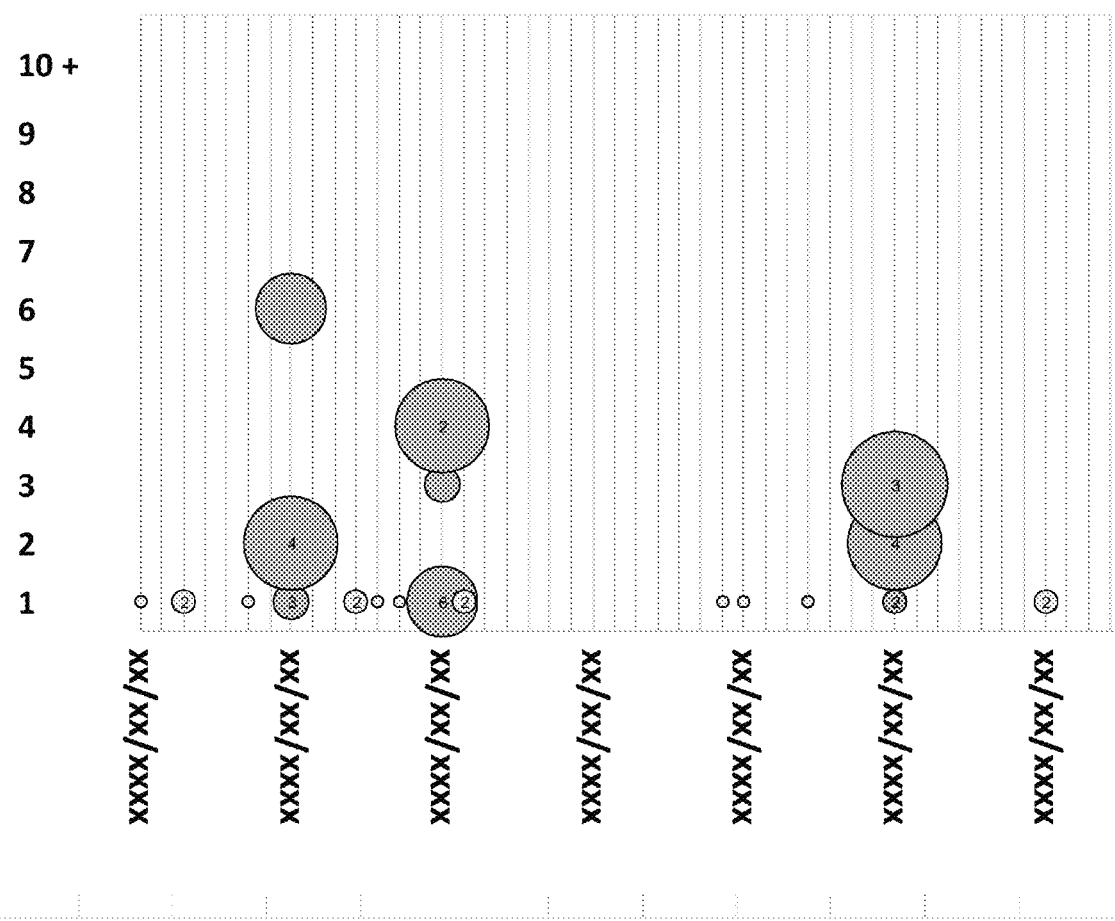
Figure 6:
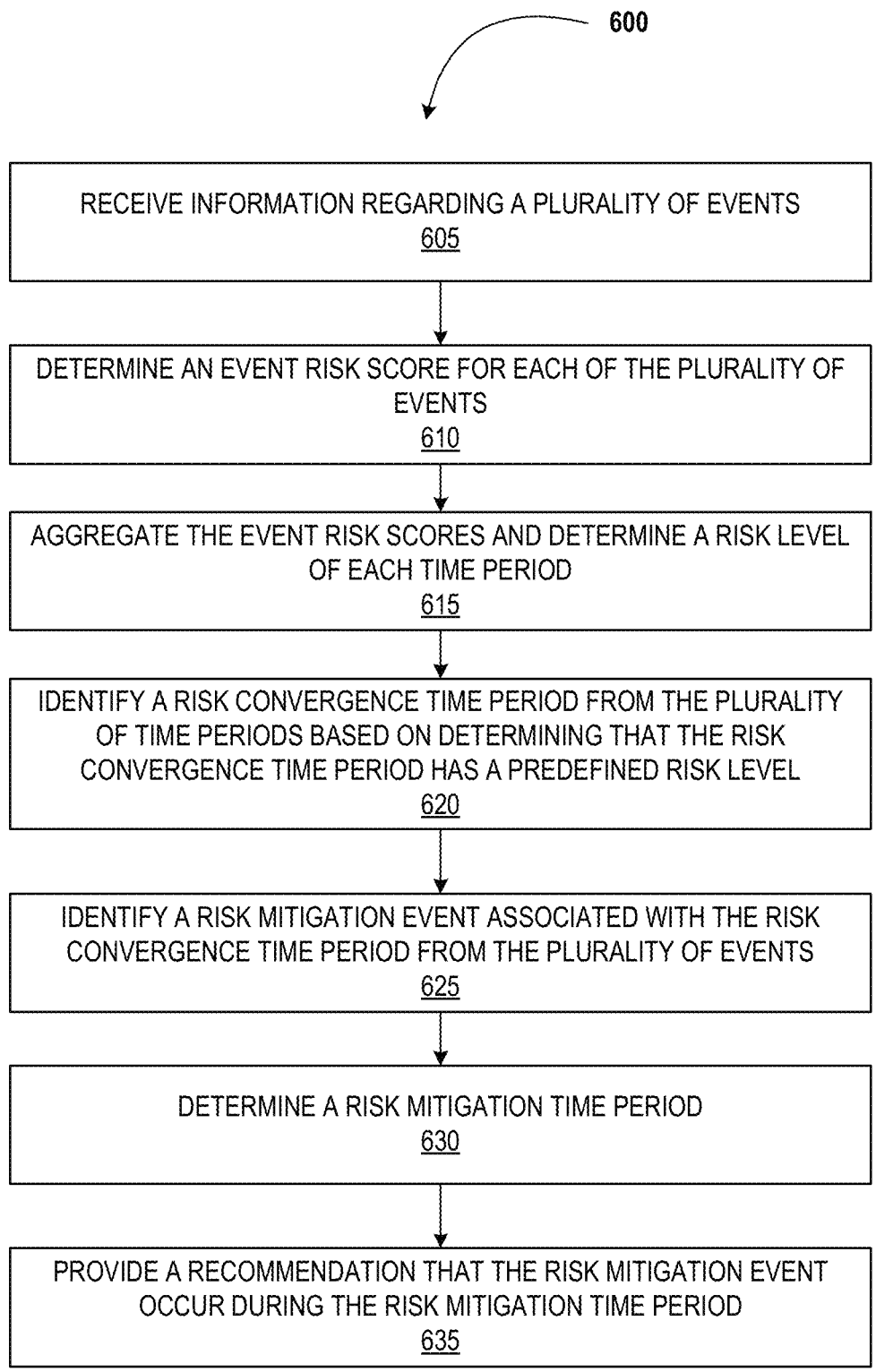
Figure 7:
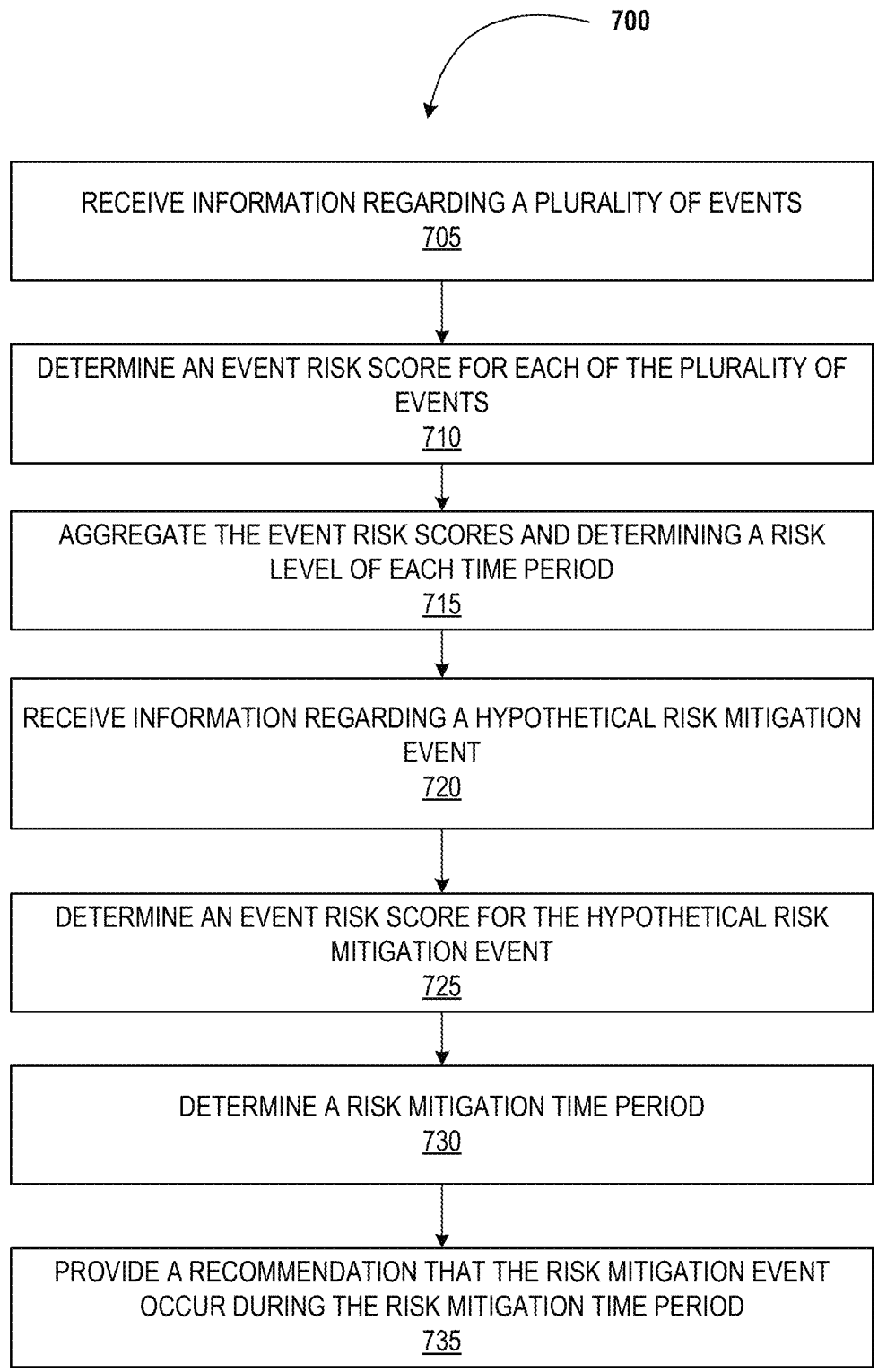

Having thus described embodiments of the invention in general terms, reference will now be made the accompanying drawings, wherein:

FIG. 1 depicts a risk convergence risk management system and operating environment in accordance with an exemplary embodiment of the present invention;

FIG. 2 schematically depicts a change convergence risk management system in accordance with an exemplary embodiment of the present invention;

FIG. 3 depicts a method of change convergence risk mapping in accordance with an exemplary embodiment of the present invention;

FIG. 4 depicts a bubble chart showing the aggregated risk scores of a plurality of time periods;

Figure 5:
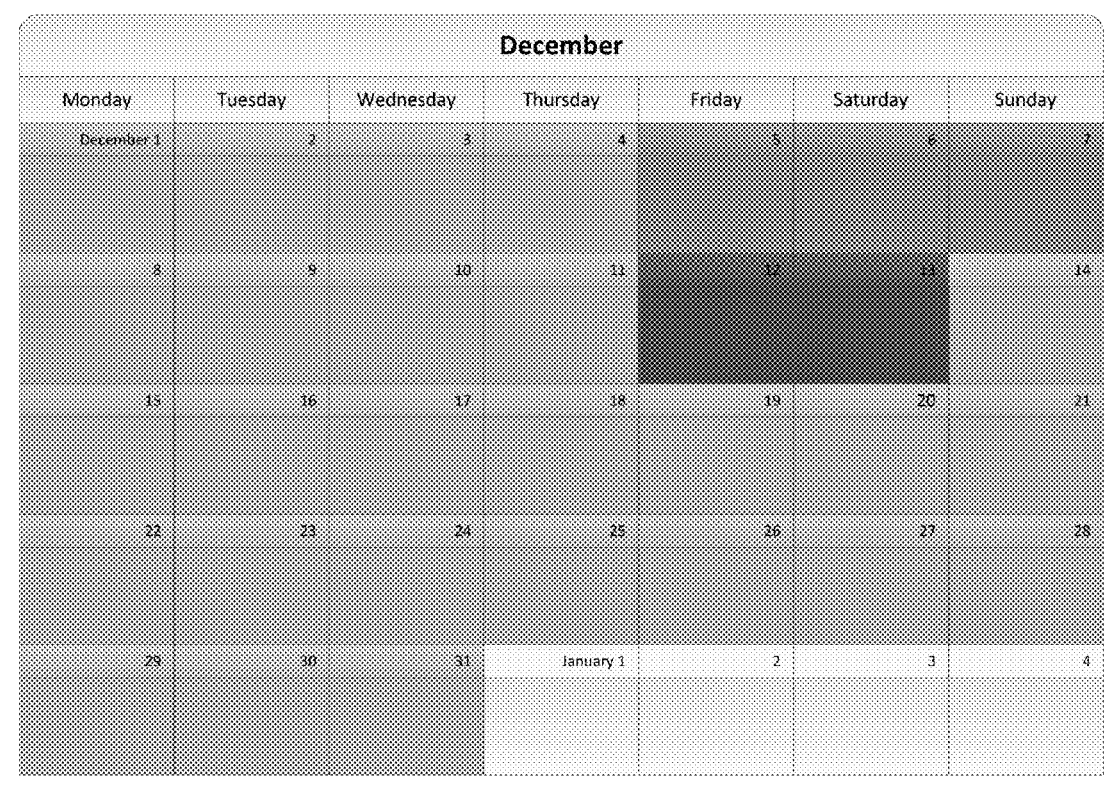

FIG. 5 depicts a calendar showing the risk levels of a plurality of time periods;

FIG. 6 depicts a method of change convergence risk mitigation for a planned event; and FIG. 7 depicts a method of change convergence risk mitigation for a hypothetical event.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "financial institution" and "financial entity" include any organization that processes financial transactions including, but not limited to, banks, credit unions, savings and loan associations, investment companies, stock brokerages, asses management firms, insurance companies and the like. In specific embodiments of the invention, use of the term "bank" is limited to a financial entity in which account-bearing customers conduct financial transactions, such as account deposits, withdrawals, transfers and the like.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that engage in risk assessment and management.

A "user" may be any person or entity using a change convergence risk mapping system described herein. Often, a user is an employee of an entity (e.g., a financial institution) using a change convergence risk mapping system. In some instances a user has a management position within an entity using a change convergence risk management system.

As used herein, the term "program" relates to a large body of work that has the goal of achieving one or more business outcomes. A program may have a defined beginning and end or may be ongoing. In contrast, the term "project" relates to an endeavor within a program undertaken to provide one or more outputs. These outputs typically help to achieve one or more business goal of an overarching program. While a program is often ongoing, projects typically have a defined beginning and end.

As used herein, the term "event" relates to an internal business activity or to an external occurrence. An internal event may be any activity engaged in by an entity. An internal event is often an event that occurs as part of a program or project. Internal events often involve change to business systems, programs, processes, or products. For example, an internal event may be the deployment of new software, a software or hardware upgrade, the release of a new product or service, an upgrade or change to an existing product or service, a regulatory event, a human resources event, or a business governance event. An external event may be anything that occurs outside of an entity's control but may have an impact on the entity. For example, an external event may be a holiday or a weather event. Events are typically prospective events. In other words, events are typically either future planned internal events or external events that are projected or predicted to occur in the future. That said, in some embodiments events can be hypothetical events (e.g., an event not yet planned to occur).

In one aspect, the present invention embraces a change convergence risk mapping system that may be used by an entity, such as a financial institution, to engage in risk assessment and management. In particular, the change convergence risk mapping system that may be used to detect the convergence of risks associated with multiple events. In this regard, FIG. 1 depicts an operating environment 100 according to one embodiment of the present invention that facilitates risk assessment and management for an entity (e.g., a financial institution). The operating environment includes a change convergence risk management system 200. In addition, one or more users, each having a user computing device 120, such as a PC, laptop, mobile phone, tablet, television, mobile device, or the like, may be in communication with change convergence risk management system 200 via a network 100, such as the Internet, wide area network, local area network, Bluetooth network, near field network, or any other form of contact or contactless network.

FIG. 2 depicts the change convergence risk management system 200 in more detail. As depicted in FIG. 2 the change convergence risk management system 200 typically includes various features such as a network communication interface 210, a processing device 220, and a memory device 250. The network communication interface 210 includes a device that allows the change convergence risk management system 200 to communicate over the network 110 (shown in FIG. 1) with the user computing devices 120. In this regard, an interface (e.g., a graphical user interface) is typically presented on each user computing device to allow each user to interact with the change convergence risk management system.

As used herein, a "processing device," such as the processing device 220, generally refers to a device or combination of devices having circuitry used for implementing the communication and/or logic functions of a particular system. For example, a processing device 220 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 220 may further include functionality to operate one or more software programs based on computer-executable program code thereof, which may be stored in a memory. As the phrase is used herein, a processing device 220 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device," such as the memory device 250, generally refers to a device or combination of devices that store one or more forms of computer-readable media for storing data and/or computer-executable program code/instructions. Computer-readable media is defined in greater detail below. For example, in one embodiment, the memory device 250 includes any computer memory that provides an actual or virtual space to temporarily or permanently store data and/or commands provided to the processing device 220 when it carries out its functions described herein.

As noted, the change convergence risk management system 200 is configured to perform risk assessment and management. Accordingly, the change convergence risk management system 200 typically includes one or more modules stored in the memory device 250, which facilitate risk assessment and management. As depicted in FIG. 2, the change convergence risk management system 200 typically includes a risk aggregation module 255 and a risk mitigation module 260.

The risk aggregation module 255 is typically configured so that one or more users can interact (e.g., via user computing devices) with the change convergence risk management system 200 in order to assess and manage risk. In particular, the risk aggregation module 255 is typically configured to aggregate the risks associated with multiple events and to detect the convergence of risks associated with the events.

In a particular aspect, the risk aggregation module 255 is configured to map the convergence of risks for a plurality of events. In this regard, FIG. 3 depicts a method 300 of change convergence risk mapping that may be performed by the risk aggregation module 255.

Accordingly, at block 305, the risk aggregation module 255 is typically configured initially to receive information associated with a plurality of events (e.g., internal and/or external events) from a user and store the received information in the memory device 250. The information associated with each event typically includes an event identification (e.g., the name of the event), event timing information (i.e., when the event will occur), and event risk information (e.g., the type and degree of risk to the entity).

The event risk information may include information (e.g., the degree of risk) associated with a plurality of risk factors. Exemplary risk factors may include: the degree of employee impact, the degree of client/customer impact, reputational impact if event is unsuccessful, financial impact if event is unsuccessful, whether the event is an independent deployment during but not part of a release, technological complexity, the impact on critical business processes, whether the event is in response to a regulatory requirement, the degree to which the event impacts multiple lines of business, the impact on critical business processes within a single line of business, the impact on important entity applications, the degree of impact on particular customer, client, or employee groups or subgroups, and the volume and importance of customer transactions impacted. Each risk factor may have an associated risk factor rating for each event, the risk factor rating reflecting the degree of risk associated with each particular risk factor.

In some embodiments, the risk aggregation module 255 prompts a user to provide risk information regarding one or more events (e.g., after receiving initial information regarding the event). In some embodiments, the user may be prompted to provide a risk factor score for one or more of the risk factors associated with an event. In further embodiments, the user may be prompted to answer one or more questions regarding one or more risk factors associated with an event (e.g., via a graphical user interface (GUI) presented to the user). The risk aggregation module 255 may then use these answers to generate risk factor scores for the event. In one embodiment, each risk factor score may have a value between 1 and 9, with a value of 1 reflecting low risk, a value of 3 reflecting medium risk, and a value of 9 reflecting high risk.

Based on the received event risk information, at block 310, the risk aggregation module 255 typically determines an event risk score for each event. The event risk score reflects the risk to the entity from the event. The event risk score is typically based on the combined risk of all of the risk factors associated with the event. In a particular embodiment, the event risk score is a weighted average of the risk factors associated with the event and may be represented as follows:

$$\text{Event Risk Score} = \sum_{i=1}^{n} \text{Factor Rating}_i \times \text{Factor Weight}_i$$

wherein,
Factor Rating=the assessed numerical score of a risk factor that contributes to the event risk score;
Factor Weight=the magnitude of a risk factor's contribution to the event risk score; and
n=the total number of risk factors.

The factor rating may be provided by a user or generated by the risk aggregation module based on answers provided by a user to risk factor questions. The factor weight may be predefined (e.g., by the entity) and may reflect the relative importance of each risk factor to the overall risk associated with an event. In one embodiment, the factor weight is a percentage between 0 and 100, where the sum of all factor weights for a particular event is 100%. By way of example, the degree of client/customer impact risk factor may have a factor weight of 25%, the technological complexity risk factor may have a factor weight of 15%, and the sum of the factor weights for the remaining risk factors may be 60%. In one embodiment, the risk event score may have a value between 1 and 9, with a value of 1 reflecting low risk, a value of 3 reflecting medium risk, and a value of 9 reflecting high risk.

In one embodiment, one or more event risk scores may be weighted based on one or more weighting parameters. Exemplary weighting parameters include execution performance, operational stability, and control performance. For example, if a change event is being implemented by a particular organization within the entity, the organization's history of executing prior events and controlling the risks associated with such prior events may be used to weight the event risk score of the change event. Thus, if the organization has a good history of executing events and controlling risks, then the change event's risk score may be weighted to produce a lower event risk score. On the other hand, if the organization does not have a good history of executing events and controlling risks, then the change event's risk score may be weighted to produce a lower event risk score.

Subsequently, at block 315, the risk aggregation module 255 typically aggregates the event risk scores for all of the events and determines an aggregated risk score for each time period. Typically, the aggregated risk score for each time period is the sum of the event risk scores for each event occurring with a particular time period. In one embodiment, the events may be sorted by their associated time period (e.g., day, week, or month) and graphically presented to a user (e.g., to a user computer system). As depicted in FIG. 4, the aggregated event risk scores may be graphically presented to a user in the form of a bubble chart. In FIG. 4, the y-axis represents the event risk score and the x-axis represents a plurality of time periods (e.g., individual days), with each vertical gridline representing a single time period. Each bubble reflects the events that occur during a particular time period and having a certain event risk score. The number inside each bubble represents the total number of events during a specific time period that have a certain event risk score, where the lack of a number reflects the existence of a single event. The size of each bubble reflects the combined event risk score of all events represented by the bubble, with larger bubble having a higher combined event risk score. If the aggregated risk level (explained below) for a time period is high or elevated, then all of the bubbles for that time period may be a first color (e.g., orange), but if the aggregated risk level for a time period is low, then all of the bubbles for that time period may be a second color (e.g., green).

As noted, at block 320, the risk aggregation module 255 typically determines the risk level associated with each time period. In order to determine the risk level of each time period, the risk aggregation module 255 will typically determine an aggregated risk score for each time period. If the aggregated risk score of a time period exceeds a first aggregated risk score threshold (e.g., a predefined threshold) or if a predefined number of events within the time period have an event risk score exceeding a first event risk score threshold, then the time period may be designated by the aggregation module 255 as having a high risk level. In one embodiment, the time period may also be designated by the aggregation module 255 as having a high risk level if a predefined number of events within the time period have an event risk score exceeding a second event risk score threshold.

In one embodiment, if the time period does not have a high risk level then the time period may be designated by the aggregation module 255 as having a low risk level.

In an alternative embodiment, the aggregation module 255 may determine if the time period has an elevated risk level (e.g., an intermediate risk level between a low risk level and a high risk level). In this regard, if the aggregated risk score of a time period exceeds a second aggregated risk score threshold (e.g., a predefined threshold) or if a predefined number of events within the time period have an event risk score exceeding a third event risk score threshold, and if the time period does not have a high risk level, then the time period may be designated by the aggregation module 255 as having an elevated risk level. In one embodiment, the time period may also be designated by the aggregation module 255 as having an elevated risk level if a predefined number of events within the time period have an event risk score exceeding a fourth event risk score threshold. If the time period does not have a high risk level or an elevated risk level then the time period may be designated by the aggregation module 255 as having a low risk level.

By way of example, if the aggregated risk score of a time period is greater than 14 or if at least one event in the time period has an event risk score of at least 6, then the time period is designated has having a high risk level. If the time period does not have a risk level, but if the aggregated risk score of the time period is greater than 10, if at least one event in the time period has an event risk score of at least 4, or if at least two events in the time period have an event risk score of at least 3, then the time period is designated has having an elevated risk level. If the time period does not have an elevated risk level or a high risk level, then the time period is designated as having a low risk level.

In a particular embodiment, the determination of a certain time period's risk level is further based on one or more secondary convergence factors. The secondary convergence factors may include a plurality events during the time period having a (i) common critical business process, (ii) common geographic region, (iii) common physical location (e.g., building or city), (iv) common logical location (e.g., database), (v) common event type, (vi) common entity system, (vii) common customers, or (viii) common employees. In other words, a time period's risk level might not be just based on the convergence of event risk during the same time period, but might also be based on the convergence of risk affecting the same process, region, location, system, or the like. In this regard, determining an aggregated risk score for a time period may be based on the event risk score of events (i) associated with the time period and (ii) having a common secondary convergence factor (e.g., occurring in the same building or involving a change to the same business process). Furthermore, determining a risk level for such time period may be based on determining that (i) such aggregated risk score exceeds a predefined aggregated risk score threshold or (ii) a predefined number of events associated with such time period and having a common secondary convergence factor have an event risk score exceeding a predefined event risk score threshold.

Subsequently, at block 325, the aggregation module 255 may graphically present the risk level of one or more time periods to a user (e.g., via a user computing device). In particular, the risk aggregation module 255 may present a graphical representation of one or more time periods (e.g., days) with a risk level indicator proximate to or overlaying at least a portion of the graphical representation of each time period. Each risk level indicator reflects the determined risk level of its associated time period. For example, each risk level indicator may have a color or pattern that is indicative of its associated time period's risk level. By way of further example, as depicted in FIG. 5, the aggregation module 255 may graphically present a calendar to the user, where each time period is a single day. As depicted in FIG. 5, days with a low risk level may be colored green, days with an elevated risk level may be colored orange, and days with a high risk level may be colored red. The foregoing notwithstanding, any way of graphically presenting (e.g., a line graph) the risk level of one or more time periods is within the scope of the present invention. In one embodiment, graphically presenting the risk level of one or more time periods may be based on events having one or more common secondary convergence factors (e.g., graphically presenting the risk level over time associated with a particular building in which the risk level of each time period is based only on events associated with the particular building).

In another aspect, the change convergence risk management system 200 is configured to engage in risk mitigation. Therefore, as depicted in FIG. 2, the change convergence risk management system 200 typically includes the risk mitigation module 260. The risk mitigation module 260 is typically configured to provide a recommendation to avoid risk convergence.

In one particular aspect, the risk mitigation module 260 may be configured to provide a recommendation that the timing of a planned event be changed. In this regard, FIG. 6 depicts a method 600 of change convergence risk mitigation for a planned event that may be performed by the change convergence risk management system 200 (e.g., by the risk mitigation module 260 and/or the risk aggregation module 255).

Accordingly, at block 605, the change convergence risk management system 200 is typically configured initially to receive information regarding a plurality of events (e.g., internal planned events and external events) occurring during a plurality of time periods (e.g., received from a user) and store the received information in the memory device 250. The information associated with each event typically includes an event identification, event timing information, and event risk information. The event risk information may include information associated with a plurality of risk factors. As described above, a user may be prompted to provide risk information regarding one or more events.

Based on the received event risk information, at block 610, the change convergence risk management system 200 typically determines an event risk score for each event (e.g., based on one or more risk factor scores).

Subsequently, at block 615, the change convergence risk management system 200 typically aggregates the event risk score for all of the events (e.g., to determine an aggregated risk score for each time period) and, based on the event risk scores, determines a risk level for each time period. The risk level for a certain time period may be based on determining if that time period's aggregated risk score exceeds an aggregated risk score threshold or if a predefined number of events within that time period have an event risk score exceeding an event risk score threshold.

At block 620, the change convergence risk management system 200 identifies a risk convergence time period from the plurality of time periods by determining if the time period has a predefined risk level (e.g., a high risk level or an elevated risk level). In other words, the risk convergence time period is typically a time period having an undesirable level of risk. In a particular embodiment, the risk convergence time period is a time period having a high risk level or an elevated risk level. In another particular embodiment, the risk convergence time period is a time period having a high risk level. If the change convergence risk management system 200 does not identify a risk convergence time period, then no action need be taken by the change convergence risk management system 200.

Next, at block 625, the change convergence risk management system 200 identifies a risk mitigation event associated with the risk convergence time period. In one embodiment, the risk mitigation event is an event occurring during the risk convergence time period such that if the risk mitigation event did not occur during the risk convergence time period (e.g., if the timing information of the risk mitigation event was altered), then the risk convergence time period would have a reduced level of risk. In a particular embodiment, the risk mitigation event is one of the plurality of events occurring during the risk convergence time period such that if the risk mitigation event did not occur during the risk convergence time period, then the risk convergence time period would not have the predefined risk level (e.g., not have a high risk level or an elevated risk level).

Based on identifying the risk convergence time period and the risk mitigation event, at block 630, the change convergence risk management system 200 determines a risk mitigation time period. Typically, the risk mitigation time period is one of the plurality of time periods such that the risk mitigation time period would not have the predefined risk level (e.g., not have a high risk level or an elevated risk level) if the risk mitigation event occurred during the risk mitigation time period. In order to identify the risk mitigation time period, the event risk score of the risk mitigation event is used to determine a hypothetical risk level for one or more of the plurality of time periods assuming the risk mitigation event was to occur during such time periods. Typically, any time period having a hypothetical risk level less than the predefined risk level may be designated as a risk mitigation time period. In one embodiment, the time period having the lowest hypothetical risk level less than the predefined risk level may be designated as the risk mitigation time period. In another embodiment, the designation of the risk mitigation time period may be based on additional parameters (e.g., time period preferences provided by a user). In yet another embodiment, a plurality of risk mitigation time periods may be designated.

Finally, at block 635, the change convergence risk management system 200 provides a recommendation that the risk mitigation event occur during an identified risk mitigation time period. For example, the change convergence risk management system 200 may transmit such a recommendation to the user computing device 120A. A user may use this recommendation in order to consider moving the timing of the risk mitigation event to the risk mitigation time period. If the user does decide to move the timing of the risk mitigation event, the user subsequently may modify the information associated with the risk mitigation event to indicate that the risk mitigation event will occur during the risk mitigation time period.

Although, the foregoing method of change convergence risk mitigation for a planned event is described with respect to a single risk mitigation event, it is within the scope of the present invention to identify and provide a recommendation regarding a plurality of risk mitigation events occurring during the same risk convergence time period. In this regard, altering the timing of a single event may not sufficiently reduce the level of risk of the risk convergence time period. Therefore, the change convergence risk management system 200 may be configured to identify a plurality of risk mitigation events that, if moved, would sufficiently reduce the risk level of the risk convergence time period. The change convergence risk management system 200 may then identify one or more risk mitigation time periods to which one or more of such risk mitigation events may be moved.

In another particular aspect, the risk mitigation module 260 may be configured to provide a recommendation for the timing of a hypothetical event (e.g., an event whose timing has not yet been planned). In this regard, FIG. 7 depicts a method 700 of change convergence risk mitigation for a hypothetical event that may be performed by the change convergence risk management system 200 (e.g., by the risk mitigation module 260 and/or the risk aggregation module 255).

Accordingly, at block 705, the change convergence risk management system 200 is typically configured initially to receive information regarding a plurality of events (e.g., internal planned events and external events) occurring during a plurality of time periods (e.g., received from a user) and store the received information in the memory device 250. The information associated with each event typically includes an event identification, event timing information, and event risk information. The event risk information may include information associated with a plurality of risk factors. As described above, a user may be prompted to provide risk information regarding one or more events.

Based on the received event risk information, at block 710, the change convergence risk management system 200 typically determines an event risk score for each event (e.g., based on one or more risk factor scores).

Subsequently, at block 715, the change convergence risk management system 200 typically aggregates the event risk score for all of the events (e.g., to determine an aggregated risk score for each time period) and, based on the event risk scores, determines a risk level for each time period. The risk level for a certain time period may be based on determining if that time period's aggregated risk score exceeds an aggregated risk score threshold or if a predefined number of events within that time period have an event risk score exceeding an event risk score threshold.

At block 720, the change convergence risk management system 200 receives information regarding a hypothetical risk mitigation event (e.g., received from a user computing system in communication with the change convergence risk management system 200). The information regarding the hypothetical risk mitigation event typically includes event risk information.

Next, at block 725, the change convergence risk management system 200 uses the event risk information for the hypothetical risk mitigation event to determine an event risk score for the risk mitigation event.

Subsequently, at block 730, the change convergence risk management system 200 determines one or more risk mitigation time periods. Typically, a risk mitigation time period is one of the plurality of time periods such that the risk mitigation time period would not have a predefined risk level (e.g., not have a high risk level or an elevated risk level) if the hypothetical risk mitigation event occurred during the risk mitigation time period. In order to identify the risk mitigation time period, the event risk score of the risk mitigation event is used to determine a hypothetical risk level for one or more of the plurality of time periods assuming the hypothetical risk mitigation event was to occur during such time periods. Typically, any time period having a hypothetical risk level less than the predefined risk level may be designated as a risk mitigation time period. In one embodiment, the time period having the lowest hypothetical risk level less than the predefined risk level may be designated as the risk mitigation time period. In another embodiment, the designation of the risk mitigation time period may be based on additional parameters (e.g., time period preferences provided by a user). In yet another embodiment, a plurality of risk mitigation time periods may be designated.

Finally, at block 735, the change convergence risk management system 200 provides a recommendation that the hypothetical risk mitigation event occur during an identified risk mitigation time period. For example, the change convergence risk management system 200 may transmit such a recommendation to the user computing device 120A. A user may use this recommendation in order to plan the timing of the risk mitigation event such that it occurs during the risk mitigation time period. If the user does decide to plan the timing of the risk mitigation event to occur during the risk mitigation time period, the user subsequently may provide corresponding event information to the change convergence risk management system 200.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A change convergence risk mitigation system, comprising:
    a processor;
    a memory;
    a risk mitigation module stored in the memory, executable by the processor and configured for:
        receiving information associated with a plurality of events occurring during a plurality of time periods, wherein the information associated with each event includes event timing information and event risk information;
        determining an event risk score for each of the plurality of events;
        aggregating the event risk scores of the plurality of events occurring during a time period and, based on the event risk scores, determining a total risk level for each of the plurality of time periods;
        determining that the total risk level for a first time period of the plurality of time periods is at least equal to a predefined risk level;

identifying a risk mitigation event occurring in the first time period where the risk mitigation event has an associated event risk score that would cause the first time period to have a total risk level that is lower than the predefined risk level if the risk mitigation event was not scheduled to occur in the first time period,
    wherein receiving information associated with a plurality of events further comprises receiving information associated with the risk mitigation event, wherein the information associated with the risk mitigation event includes event timing information and event risk information, the event timing information associated with the risk mitigation event indicating that the risk mitigation event is associated with the first time period;

based on the event risk score associated with the risk mitigation event, determining a risk mitigation time period from the plurality of time periods such that the risk mitigation time period would not have the predefined risk level if the risk mitigation event occurred during the risk mitigation time period;

providing a recommendation that the risk mitigation event occur during the risk mitigation time period comprising transmitting electronically the recommendation to a user computing device;

receiving from the user computing device a decision to move the risk mitigation event to the risk mitigation period; and modifying the information associated with the risk mitigation event to indicate that the risk mitigation event will occur during the risk mitigation time period.

2. The change convergence risk mitigation system according to claim 1, wherein determining a risk level for each of the plurality of time periods is further based on one or more secondary convergence factors.

3. The change convergence risk mitigation system according to claim 2, wherein the secondary convergence factors comprise a plurality of events during a time period being associated with a common (i) critical business process, (ii) geographic region, (iii) location, (iv) event type, or (v) entity system.

4. The change convergence risk mitigation system according to claim 1, wherein:
    identifying a risk mitigation event comprises (i) receiving information associated with a risk mitigation event, the information associated with the risk mitigation event including event risk information, and (ii) determining the event risk score of the risk mitigation event; and
    the risk mitigation event is a hypothetical event.

5. A computer program product for change convergence risk mitigation comprising a non-transitory computer-readable storage medium having computer-executable instructions for:
    receiving information associated with a plurality of events occurring during a plurality of time periods, wherein the information associated with each event includes event timing information and event risk information;
    determining an event risk score for each of the plurality of events;
    aggregating the event risk scores of the plurality of events occurring during a time period and, based on the event risk scores, determining a total risk level for each of the plurality of time periods;
    determining that the total risk level for a first time period of the plurality of time periods is at least equal to a predefined risk level;
    identifying a risk mitigation event occurring in the first time period where the risk mitigation event has an associated event risk score that would cause the first time period to have a total risk level that is lower than the predefined risk level if the risk mitigation event was not scheduled to occur in the first time period,
    wherein receiving information associated with a plurality of events further comprises receiving information associated with the risk mitigation event, wherein the information associated with the risk mitigation event includes event timing information and event risk information, the event timing information associated with the risk mitigation event indicating that the risk mitigation event is associated with the first time period;
    based on the event risk score associated with the risk mitigation event, determining a risk mitigation time period from the plurality of time periods such that the risk mitigation time period would not have the predefined risk level if the risk mitigation event occurred during the risk mitigation time period;
    providing a recommendation that the risk mitigation event occur during the risk mitigation time period comprising transmitting electronically the recommendation to a user computing device;
    receiving from the user computing device a decision to move the risk mitigation event to the risk mitigation period; and
    modifying the information associated with the risk mitigation event to indicate that the risk mitigation event will occur during the risk mitigation time period.

6. The computer program product according to claim 5, wherein determining a risk level for each of the plurality of time periods is further based on one or more secondary convergence factors.

7. The computer program product according to claim 6, wherein the secondary convergence factors comprise a plurality of events during a time period being associated with a common (i) critical business process, (ii) geographic region, (iii) location, (iv) event type, or (v) entity system.

8. The computer program product according to claim 5, wherein:
    identifying a risk mitigation event comprises (i) receiving information associated with a risk mitigation event, the information associated with the risk mitigation event including event risk information, and (ii) determining the event risk score of the risk mitigation event; and
    the risk mitigation event is a hypothetical event.

9. A method for change convergence risk mitigation, comprising:
    receiving, via a microprocessor, information associated with a plurality of events occurring during a plurality of time periods, wherein the information associated with each event includes event timing information and event risk information;
    determining, via a microprocessor, an event risk score for each of the plurality of events;
    aggregating, via a microprocessor, the event risk scores of the plurality of events occurring during a time period and, based on the event risk scores, determining a total risk level for each of the plurality of time periods;
    determining, via a microprocessor, that the total risk level for a first time period of the plurality of time periods is at least equal to a predefined risk level;
    identifying, via a microprocessor, a risk mitigation event occurring in the first time period where the risk mitigation event has an associated event risk score that would cause the first time period to have a total risk level that is lower than the predefined risk level if the risk mitigation event was not scheduled to occur in the first time period, wherein receiving information associated with a plurality of events further comprises receiving information associated with the risk mitigation event, wherein the information associated with the risk mitigation event includes event timing information and event risk information, the event timing information associated with the risk mitigation event indicating that the risk mitigation event is associated with the first time period;

based on the event risk score associated with the risk mitigation event, determining, via a microprocessor, a risk mitigation time period from the plurality of time periods such that the risk mitigation time period would not have the predefined risk level if the risk mitigation event occurred during the risk mitigation time period;

providing, via a microprocessor, a recommendation that the risk mitigation event occur during the risk mitigation time period comprising transmitting electronically the recommendation to a user computing device;

receiving from the user computing device a decision to move the risk mitigation event to the risk mitigation period; and modifying the information associated with the risk mitigation event to indicate that the risk mitigation event will occur during the risk mitigation time period.

10. The method according to claim 9, wherein determining a risk level for each of the plurality of time periods is further based on one or more secondary convergence factors.

11. The method according to claim 10, wherein the secondary convergence factors comprise a plurality of events during a time period being associated with a common (i) critical business process, (ii) geographic region, (iii) location, (iv) event type, or (v) entity system.

12. The method according to claim 9, wherein:
identifying a risk mitigation event comprises (i) receiving information associated with a risk mitigation event, the information associated with the risk mitigation event including event risk information, and (ii) determining the event risk score of the risk mitigation event; and
the risk mitigation event is a hypothetical event.

* * * * *